C. C. McKINLEY.
Improvement in Self-Loading and Dumping-Carts.
No. 129,154.
Patented July 16, 1872.
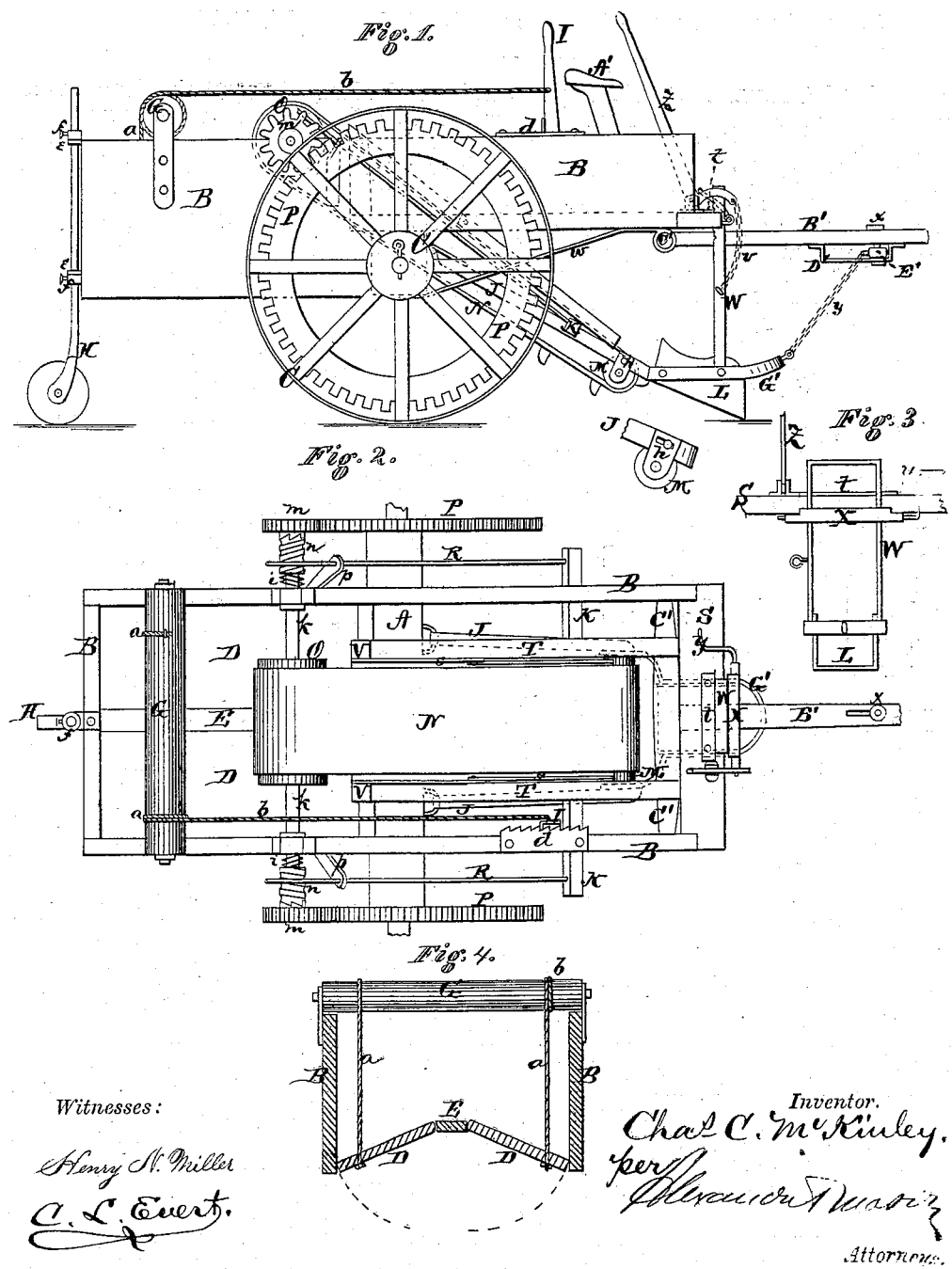

UNITED STATES PATENT OFFICE.

CHARLES C. McKINLEY, OF CHAMPAIGN, ILLINOIS.

IMPROVEMENT IN SELF-LOADING AND DUMPING CARTS.

Specification forming part of Letters Patent No. 129,154, dated July 16, 1872.

Be it known that I, CHARLES C. McKINLEY, of Champaign, in the county of Champaign, and in the State of Illinois, have invented certain new and useful Improvement in Self-Loading and Dumping Cart; and do hereby declare that the following is a full, clear, and exact description thereof, reference being had to the accompanying drawing and to the letters of reference marked thereon making a part of this specification.

The nature of my invention consists in the construction and arrangement of a self-loading and dumping cart, as will be hereinafter more fully set forth.

In order to enable others skilled in the art to which my invention appertains to make and use the same, I will now proceed to describe its construction and operation, referring to the annexed drawing, in which—

Figure 1 is a side elevation, and Fig. 2 a plan view of my cart. Fig. 3 is a view of the front end of the same; and Fig. 4 is a transverse vertical section through the rear end of the cart.

A represents the axle, having spindles formed on or attached to its ends for the reception of the wheels C C. Upon the axle A is secured, in any suitable manner, a box or frame, B, the part of the same in rear of the axle forming the cart in which the dirt is loaded and from which it is dumped. A suitable distance above the lower edges of the frame B is a bar, E, running longitudinally in the center of the part of the frame behind the axle. To each side of this bar is hinged a door, D, which closes against the lower edge of the frame, and said doors form the bottom of the dumping-cart, which bottom thus is inclined from the center downward toward the sides. Each door D is connected by a cord, rope, or chain, a, with a shaft or roller, G, mounted in suitable bearings transversely across the frame; and said shaft or roller is, by a similar cord, rope, or chain, b, connected with a lever, I, pivoted in the front part of the frame, and which catches on a ratchet-plate, d, attached to the frame. The cords a a and b are so wound upon the shaft or roller G that as the cords a a unwind the cord b will be wound up, and vice versa. Hence, when it is desired to dump the load in the cart the lever I is released from the ratchet-plate d, when the weight of the load will open the doors downward, letting the dirt fall out in two piles. Then by moving the lever I forward again the doors are closed and held closed by the lever catching on the ratchet-plate d again. The rear end of the cart is supported by a caster-wheel, H, the stem of which passes through projections e e in the center of the rear end of the frame, and said stem is provided with movable collars f f, so that the wheel may be adjusted up and down at pleasure. This wheel being in the center it will be seen that after the cart has been dumped and then moves forward again this wheel will pass between the two piles and hence not raise the rear end of the cart up, which would be the case if there were two wheels at the rear end or the load were dumped all in one pile. On the front side of the axle A are hinged two bars, J J, connected by a cross-bar, K, and having the scoop L attached at their front ends. Between the front ends of the bars J J is mounted a roller, M, in adjustable journal-bearings h, and around this roller passes an endless apron, N, which also passes around a roller, O, placed upon a shaft, k, in bearings on top of the frame B, a suitable distance in rear of the axle A. The apron N is to be provided with slats, or their equivalent, at suitable intervals, so that as the apron revolves it will carry the dirt from the scoop L and deposit it in the receptacle behind the axle A.

The apron is revolved by the following means: Upon each end of the shaft k is a loose pinion, m, which gears with a cog-wheel, P, attached in any suitable manner to the inner side of the wheel C. On the inner side of each pinion m is a clutch, n, placed upon the shaft and pressed against the pinion by a spring, i. The clutches and shaft are provided with the usual grooves and feathers, so that in moving forward the shaft will be revolved, but in moving backward the clutches will be forced inward, and hence not turn the shaft, roller, and apron.

To each end of the cross-bar K, which connects the two bars J J and projects beyond the sides of the frame B, is attached a lever, R, which passes through a guide, p, attached to the side of the frame. When the bars J J, with the scoop L, are let down (by means that will be hereinafter described) for work the upper ends of the levers R R will be raised above the clutches $n$ $n$, but when the bars with the scoop are raised said levers will be brought into worm or screw-grooves made on the outside of the clutches $n$ $n$; and hence as the machine moves forward the clutches will be moved inward away from the pinions $m$ $m$, so as to throw the same out of gear. As soon as the scoop is again lowered the upper ends of the levers R are raised out of the said grooves and the springs $i$ $i$ will throw the worm-clutches $n$ $n$ in gear again. The axle A, and the foot-board S at the front end of the frame B, are connected by two parallel bars, T T, placed one on each side of the apron N. At the rear ends of these bars are standards V V, extending to about the same height as the roller O. From the upper end of each standard V extends downward an L-shaped guide, $s$, following the edge of the upper part of the roller. These guides are jointed at the points where they are attached to the bars T T, and their lower ends rest upon the cross-bar K. These joints in the guides are for the purpose of allowing the guides to accommodate themselves to the movement of the apron as the scoop is raised and lowered. By means of the adjustable journal-boxes $h$ $h$, in which the roller M has its bearings, the apron may be tightened or loosened at will. From near the front end of the scoop L a straight bail, W, extends upward, the side pieces of said bail being notched or toothed, and pass up through grooves in the front edge of the foot-board S, catching on a plate, $t$, on top of the foot-board. The bail is pressed and held against this plate by means of a horizontal bar, X, pivoted eccentrically in ears projecting from the front edge of the foot-board, and provided at one end with a foot-lever, Y. The scoop is raised by means of an L-shaped lever, Z, pivoted on top of the foot-board, and connected, by a chain, $v$, with the bail W. The levers I, Y, and Z are all arranged so that the driver from his seat A' can readily operate the same. B' represents the tongue, which at its rear end is provided with a cross-bar, C', pivoted in the front ends of braces $w$ $w$, connecting the front end of the frame B with the axle, as shown in Fig. 1. At a suitable point on the under side of the tongue is a metal bracket or loop, D', in which the double-tree E' is placed, the bolt $x$ securing the same passing through slots in the tongue and bracket, allowing the double-tree to move back and forth for a short distance. The center of the double-tree E' is, by a chain, $y$, connected with a bail, G', extending forward from the scoop L, and hence the draft comes directly upon the scoop.

Having thus fully described my invention, what I claim as new, and desire to secure by Letters Patent, is—

1. The arrangement of the axle A, hinged bars J J, scoop L, and bail W, with a device for holding the same at any desired height, substantially as herein set forth.

2. The combination of the roller O placed in stationary bearings, the roller M placed in adjustable bearings $h$ $h$ on the hinged bars J J, apron N, and jointed guides $s$ $s$, all substantially as and for the purposes herein set forth.

3. The levers R R, attached to the hinged frame J K, and operating upon the worm-clutches $n$ $n$, substantially as and for the purposes herein set forth.

4. The combination of the cog-wheel P, pinion $m$, worm-clutch $n$, spring $i$, and lever R, all constructed and arranged substantially as and for the purposes herein set forth.

5. The combination of the scoop L, bail W, plate $t$, eccentrically-pivoted bar X with foot-lever Y, and lever Z with connecting-chain $r$, substantially as and for the purposes herein set forth.

6. The combination of the slotted tongue B', slotted bracket D', double-tree E', bolt $x$, chain $y$, and bail G' on the scoop L, substantially as and for the purposes herein set forth.

In testimony that I claim the foregoing I have hereunto set my hand this 13th day of May, 1872.

CHARLES C. McKINLEY.

Witnesses:
A. N. MARR,
EDM. F. BROWN.